US008576200B2

(12) United States Patent
Zhu et al.

(10) Patent No.: US 8,576,200 B2
(45) Date of Patent: Nov. 5, 2013

(54) MULTIPLE-INPUT TOUCH PANEL AND METHOD FOR GESTURE RECOGNITION

(75) Inventors: Xiuling Zhu, NT (HK); Chenjung Tsai, Shatin (HK); Xurong Li, NT (HK)

(73) Assignee: Hong Kong Applied Science and Technology Research Institute Co. Ltd., Shatin, New Territories (HK)

( * ) Notice: Subject to any disclaimer, the term of this patent is extended or adjusted under 35 U.S.C. 154(b) by 365 days.

(21) Appl. No.: 13/020,423

(22) Filed: Feb. 3, 2011

(65) Prior Publication Data

US 2011/0122099 A1    May 26, 2011

(51) Int. Cl.
   *G06F 3/042*    (2006.01)
(52) U.S. Cl.
   USPC .......................................... 345/175
(58) Field of Classification Search
   USPC ............. 345/173, 166, 175; 178/18.01, 18.03
   See application file for complete search history.

(56) References Cited

U.S. PATENT DOCUMENTS

| | | | |
|---|---|---|---|
| 6,421,042 B1 * | 7/2002 | Omura et al. | 345/157 |
| 7,075,054 B2 * | 7/2006 | Iwamoto et al. | 250/221 |
| 7,411,575 B2 | 8/2008 | Hill et al. | |
| 7,855,716 B2 * | 12/2010 | McCreary et al. | 345/173 |
| 8,339,378 B2 * | 12/2012 | Chtchetinine et al. | 345/175 |
| 2008/0143690 A1 | 6/2008 | Jang et al. | |
| 2009/0066662 A1 | 3/2009 | Liu et al. | |

* cited by examiner

*Primary Examiner* — Abbas Abdulselam
(74) *Attorney, Agent, or Firm* — Merchant & Gould P.C.

(57) ABSTRACT

A touch panel capable of recognizing at least one gesture and the method thereof are provided. The touch panel comprises: a first optical unit, comprising a first light emitting element and a first light receiving element, arranged at a first position of the touch panel; a first optical element arranged along a first edge of the touch panel for reflecting light; a second and a third optical element arranged along a second and a third edge of the touch panel, respectively, for retro-reflecting the light, the second edge being adjacent to both the third edge and the first edge; and a processing unit for recognizing the at least one gesture according to changes to distance and slope of possible touch points.

12 Claims, 8 Drawing Sheets

MULTIPLE-INPUT TOUCH PANEL AND METHOD FOR GESTURE RECOGNITION

This application claims benefit of Ser. No. 12/700,598, filed 4 Feb. 2010 in the U.S. and Ser. No. 12/955,226, filed 20 Nov. 2010 in the United States and which applications are incorporated herein by reference. To the extent appropriate, a claim of priority is made to each of the above disclosed applications.

FIELD OF THE INVENTION

The invention relates generally to a touch system and a method therefor, and, more particularly, to at least one gesture recognition method and multiple-input touch system incorporating the same.

BACKGROUND OF THE INVENTION

With recent advances in image display technology, touch screens, used to input data by direct contact, have gained ground as display apparatuses, are becoming increasingly common in various electronic products, such as small handheld device, current generation smart phones and the like. However, if a multi-touch is generated by two or more substantially simultaneous contact points, the touch panel might malfunction or any one of the touches might be misinterpreted by the related software as an individual input, rather than part of a multi-touch gesture. In order to overcome the limits of multi-touch recognition in the touch panel of the related art, a multi-touch recognition device has recently been developed which simultaneously recognizes a plurality of touches.

One of common techniques employed in conventional gesture recognition devices for recognizing input gesture signals require two or more optical units to perform gesture recognition, wherein each of the optical units consists of a light emitting part and a light receiving part.

For example, U.S. Pat. No. 7,411,575 discloses a gesture recognition method comprising the steps of: displaying an image on a touch surface; capturing images looking generally across said touch surface; processing the captured images to detect pointer contacts on said touch surface and examining said pointer contacts to recognize different successive pointer contacts representing a gesture based on the relative positions of said pointer contacts; and when different successive pointer contacts representing a gesture occur, updating the displayed image in accordance with said gesture. For implementing the method, four cameras are required for multiple touch point detection.

Another example is a display device disclosed in US Patent Publication. No. 2008/0143690, entitled "Display device having multi-touch recognizing function and driving method thereof." It discloses a display device having a multi-touch recognition function, comprising: an integration module having a plurality of cameras integrated at an edge of a display panel; a look-up-table of a plurality of compensation angles in a range of about 0 to about 90 degrees, corresponding to each of the plurality of cameras; and a processor that detects a touch area using at least first and second images captured by the plurality of cameras, respectively, and compensates the detected touch area with one of the plurality of compensation angles. Four cameras are still required for multiple touch point detection.

Yet another example, U.S. application Ser. No. 12/071,263, proposes a system for distinguishing multiple touch points, comprising: a panel, N touch points being indicated on the panel, N being a positive integer larger than one; a first image capturing unit, disposed on a first position at an outer edge of the panel, for capturing a first image related to the N touch points; a second image capturing unit, disposed on a second position, which is opposite to the first position, at the outer edge of the panel, for capturing a second image related to the N touch points; at least one third image capturing unit, disposed at the outer edge of the panel and between the first image capturing unit and the second image capturing unit, for capturing a third image related to the N touch points; and a processing unit for calculating N sets of coordinates corresponding to the N touch points according to the first image and the second image and for determining one set of real coordinates corresponding to the N touch points from the N sets of coordinates according to the at least one third image. In this method, three image capture units are arranged for multiple touch point detection.

All gesture recognition systems in the prior art require at least two optical units or cameras to perform gesture recognition. The purpose of the invention is to introduce a method to recognize gestures on an optical touch panel with only one optical unit and improve the accuracy of the calculated touch points' locations so as to improve the reliability of the touch panel.

SUMMARY OF THE INVENTION

In view of the above, a multiple-input touch panel is provided which is capable of recognizing at least one gesture with only one optical unit, thereby reducing the manufacturing cost of the multiple-input touch panel. In addition, the accuracy of the calculated position of the touch points is improved, so as to enhance the reliability of the touch panel.

In one embodiment, a touch panel capable of recognizing at least one gesture is provided. The touch panel comprises: a first optical unit, comprising a first light emitting element and a first light receiving element, arranged at a first position, for example, a first corner, of the touch panel; a first optical element arranged along a first edge of the touch panel for reflecting light; a second and a third optical element arranged along a second and a third edge of the touch panel, respectively, for retro-reflecting the light, the second edge being adjacent to both the third edge and the first edge; and a processing unit for recognizing the gesture according to changes to distance and slope of possible touch points.

In another embodiment, a method for recognizing at least one gesture on a touch panel with a first optical unit is provided. The method comprises: obtaining a plurality of possible touch points according to intensities of light detected from a first optical element and retro-reflected by a second or a third optical element; selecting one pair of touch points from the possible touch points; locating new positions of the selected pair of touch points by finding the most adjacent points thereof; and recognizing the gesture according to changes to distance and slope between the pair of touch points and the new positions of the selected pair of touch points.

In another aspect, a method of calculating misalignment of an optical element of a touch panel is provided, wherein the touch panel comprising a first, a second, a third and a fourth edge, the optical element being positioned at the first edge. The method comprises: touching a first point at the first edge with a predetermined distance from the fourth edge adjacent to the first and the third edges and deriving a first angle between the third edge and a path connecting the first optical unit emitting light and the first point; touching a second point at the third edge with a distance twice the predetermined distance from the fourth edge, and deriving a second angle between the third edge and the path between the optical unit emitting light and a point at the optical element reflecting the light; and determining an angle of misalignment of the optical element by a difference between the first and second angles. In the method for recognizing at least one gesture on a touch panel, it is not necessary to determine the precise position of the touch points, thereby eliminating the need for more than one detector. As a result, the necessary calculation effort and manufacturing cost is reduced.

These and other features, aspects, and embodiments are described below in the section entitled "Detailed Description of the Invention."

BRIEF DESCRIPTION OF THE DRAWINGS

Features, aspects, and embodiments are described in conjunction with the attached drawings, in which.

DETAILED DESCRIPTION OF THE INVENTION

Figure 1A:
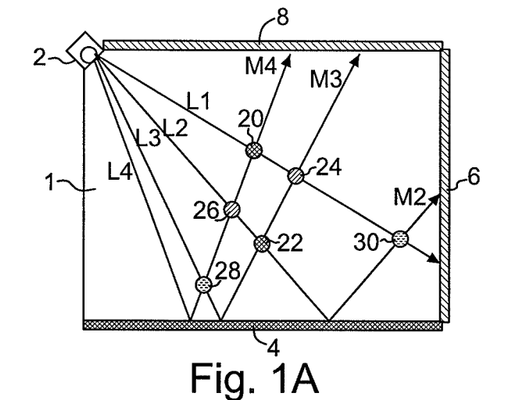
FIG. 1A is a schematic diagram showing the touch panel according to an embodiment of the subject invention.

FIG. 1A is a schematic diagram showing the structure of a touch panel 1 according to an embodiment of the subject invention. The touch panel 1 comprises an optical unit 2, optical elements 4, 6 and 8 and a processing unit (not shown). The processing unit may be an individual device or integrated in the optical unit 2. The optical unit 2 comprises a light emitting element and a light receiving element, and is arranged at a position of the touch panel. The optical element 4 comprises a mirror, and is arranged along a first edge of the touch panel for reflecting light. The optical elements 6 and 8 comprise retro-reflectors, and are arranged along a second and a third edge of the touch panel 1, respectively. The second edge where the optical element 6 is arranged adjacent to both of the third edge and the first edge where the optical elements 8 and 4 are arranged, respectively. The light emitting element is utilized to emit light at different angles. The light receiving element is utilized to receive light coming from different angles, and further generates touch signals on the basis of the intensities of the light coming from different angles. The processing unit is utilized to recognize the gesture according to changes to distance and slope of two touch points, which are determined according to the touch signals.

Figure 1B:
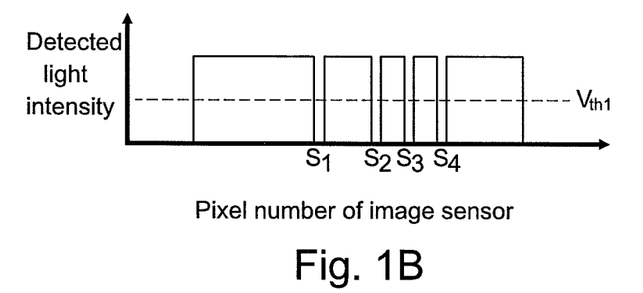
FIG. 1B shows the touch signals representing the intensity of light detected by the receiving element in the case depicted in FIG. 1A.

Please refer to FIGS. 1A and 1B. FIG. 1A also shows one case when two touch points occur. FIG. 1B shows the touch signals representing the intensity of light detected by the receiving element in the case depicted in FIG. 1A. When a pointing instrument, such as a pen, a fingertip, or a specific device, touches the touch panel 1, the light emitted to the touch point is blocked. That is to say, the intensity of the light on the direction indicating the touch point is reduced. Thus, the direction indicating the touch point can be detected by the light receiving element of the optical unit 2. For example, if the light $L_1$ is blocked by a touch point 20 as shown in FIG. 1A, the receiving element detects a signal $S_1$ representing that the intensity of detected light is lower than a threshold $V_{th1}$ in FIG. 1B. Therefore, one touch point (e.g. 20) can be defined by an intersection of paths of the light $L_1$ and $M_4$ with intensity lower than the threshold $V_{th1}$.

When two touch points 20 and 22 occur on the touch panel 1, six possible touch points 20, 22, 24, 26, 28 and 30 are generated. Each possible point is defined by an intersection of any two paths among the paths of the light $L_1$, $L_2$, $L_3$ and $L_4$ emitted by the light emitting element and the paths of the light $M_2$, $M_3$ and $M_4$ reflected by the optical element 4. In the case depicted in FIG. 1A, six possible touch points 20, 22, 24, 26, 28 and 30 can be divided into three pairs of possible touch points, wherein the first pair consists of possible touch points 20 and 22, the second pair consists of possible touch points 24 and 26 and the third pair consists of possible touch points 28 and 30. The possible touch points of each pair are defined by intersections of a path of light emitted from the first light emitting element and a path of light reflected from the first optical element 4. For example, in the first pair of possible touch points 20 and 22, one possible touch point 20 is defined by an intersection of paths of the light $L_1$ (corresponding to touch signal $S_1$) and the light $M_4$ (corresponding to touch signal $S_4$), and the other possible point 22 is defined by an intersection of paths of the light $L_2$ (corresponding to touch signal $S_2$) and the light $M_3$ (corresponding to touch signal $S_3$). When determining a pair of possible touch points, each touch signal should be used. In the three pairs of possible touch points, one pair of possible touch points would be chosen for gesture recognition. The algorism for selecting one pair of possible touch points for gesture recognition will be explained with FIG. 7.

Figure 2A:
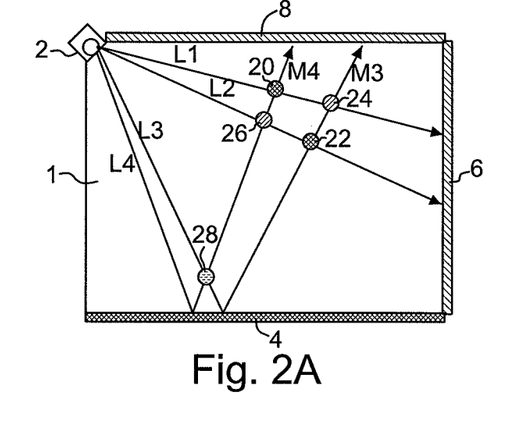
FIG. 2A shows another case on the touch panel when two touch points occur.
Figure 2B:
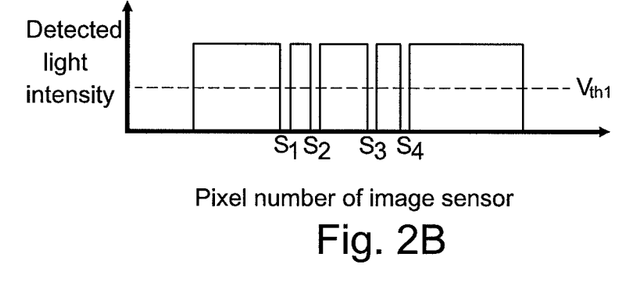
FIG. 2B shows the touch signals while the case depicted in FIG. 2A happens.

FIG. 2A shows another case when two touch points occur. FIG. 2B shows the touch signals while the case depicted in FIG. 2A happens. In FIG. 2A, when two touch points 20 and 22 occur on the touch panel 1, five possible touch points 20, 22, 24, 26 and 28 are generated in the same manner as described above. The possible point 28 is a single point. Therefore, there are only two pairs of possible touch points obtained by the touch signals.

Figure 3A:
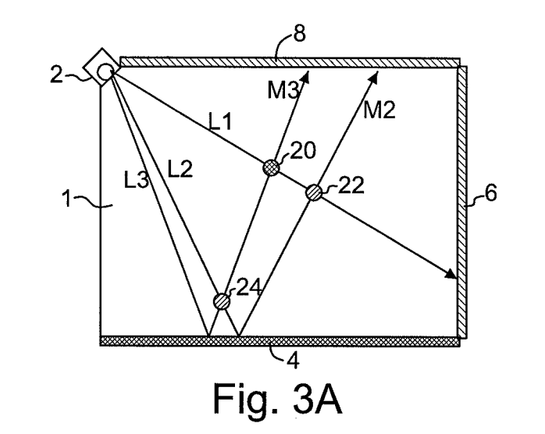
FIG. 3A shows another case on the touch panel when two touch points occur.
Figure 3B:
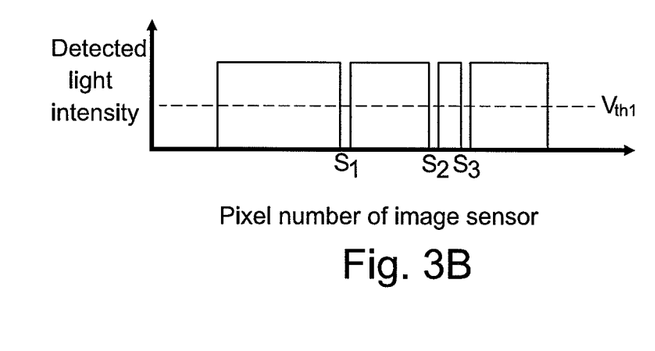
FIG. 3B shows the touch signals while the case depicted in FIG. 3A happens.

FIG. 3A shows another case on the touch panel when two touch points occur. FIG. 3B shows the detected touch signals while the case depicted in FIG. 3A happens. When two touch points 22 and 24 occur on the touch panel 1, three possible touch points 20, 22 and 24 are generated. Three possible touch points 20, 22 and 24 can be grouped into three pairs of possible touch points (i.e., 20 and 22; 20 and 24; 22 and 24).

Figure 4A:
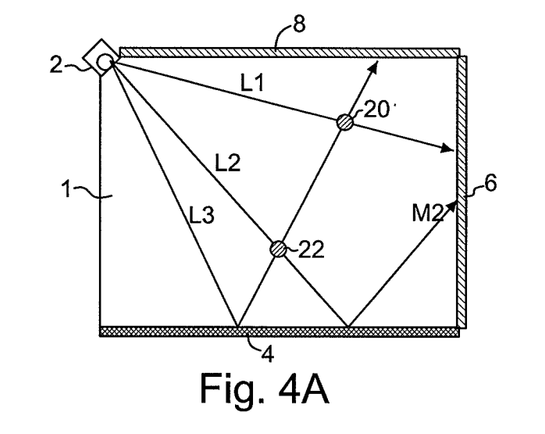
FIG. 4A shows another case when two touch points occur.
Figure 4B:
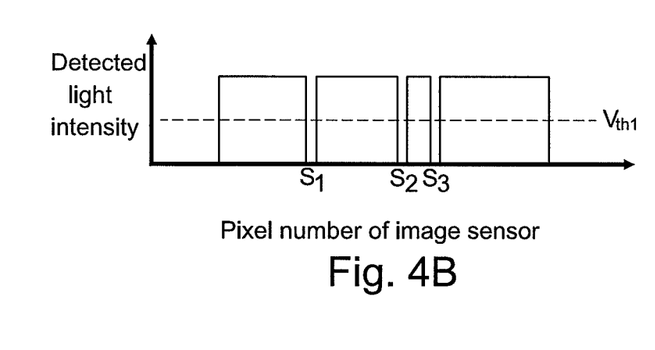
FIG. 4B shows the touch signals while the case depicted in FIG. 4A happens.

FIG. 4A shows another case when two touch points occur. FIG. 4B shows the detected touch signals while the case depicted in FIG. 4A happens. When two touch points 20 and 22 occur on the touch panel 1, only two touch points 20 and 22 are generated without any ghost point. In this case, we can determine the location of the touch points clearly.

Figure 5:
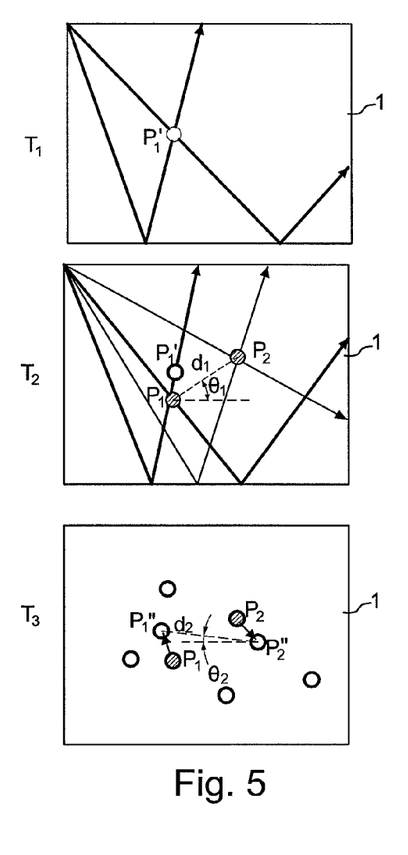
FIGS. 5 and 6 illustrate the algorism of selecting one pair of touch points among the possible touch points under two different conditions.
Figure 6:
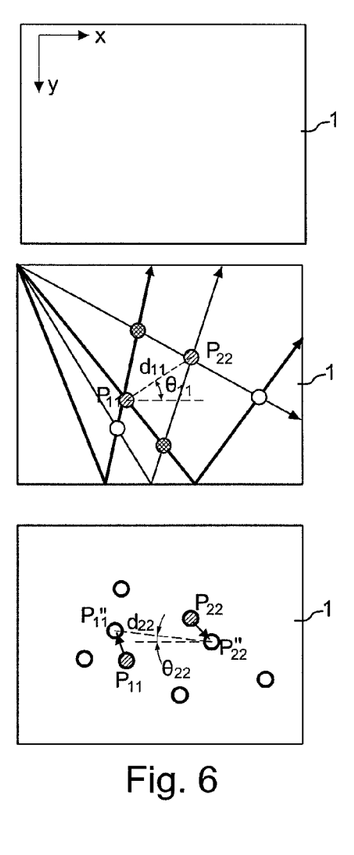
Figure 7:
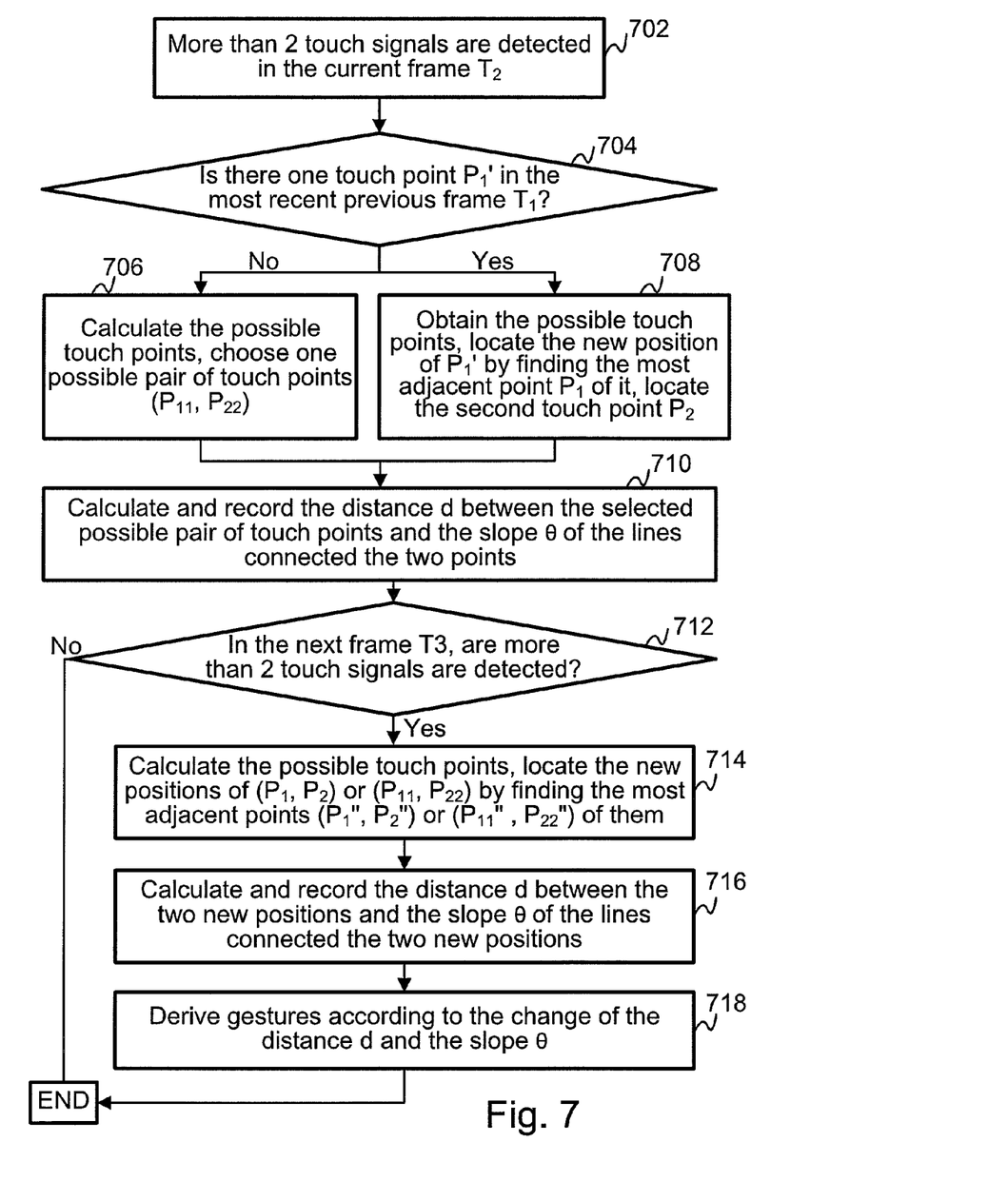
FIG. 7 illustrates a flow chart of the method for recognizing at least one gesture according to an embodiment of the subject invention.

FIG. 7 is a flow chart of the method for recognizing at least one gesture according to an embodiment of the subject invention. The algorism of selecting one pair of touch points among the possible touch points is included in the method depicted in FIG. 7. The algorism of selecting one pair of touch points includes two ways as depicted in FIGS. 5 and 6. In FIG. 5, a single touch point $P_1'$ has been located at the time point $T_1$ prior to two touch points occurring. In FIG. 6, no touch point is located at the time point $T_1$ prior to two touch points occurring.

The method in FIG. 7 for recognizing at least one gesture is explained here with reference to FIG. 5. The method starts when more than two touch signals are detected at the time point $T_2$ (step 702). In the condition of FIG. 5, there is one touch point $P_1'$ detected at the time point $T_1$ (determined by step 704). Then, a plurality of possible touch points are obtained according to the number of detected touch signals, and a touch point $P_1$ in the possible touch points nearest to the single touch point $P_1'$ is located. Accordingly, the pair of possible touch points $P_1$ and $P_2$ is selected as the one pair of touch points (step 708). After the pair of possible touch points $P_1$ and $P_2$ are selected, a first distance $d_1$ between the touch points $P_1$ and $P_2$ and a first slope $\tan(\theta_1)$ of a line connecting the touch points $P_1$ and $P_2$ are calculated and recorded (step 710). When more than two touch signals are detected at the time point $T_3$ (determined by step 712), a plurality of pairs of possible touch points are obtained according to the touch signals, and the pair of possible touch points $P_1''$ and $P_2''$ nearest to the touch points $P_1$ and $P_2$ is selected (step 714). Then, a second distance $d_2$ between the positions of the touch points $P_1''$ and $P_2''$ and a second slope $\tan(\theta_2)$ of a line connecting the touch points $P_1''$ and $P_2''$ are calculated and recorded (step 716). According to changes to distance and slope between the touch points $P_1$ and $P_2$ and the touch points $P_1''$ and $P_2''$, the gesture, such as rotating clockwise, rotating counter clockwise, zoom in and zoom out, can be recognized (step 718).

The method in FIG. 7 is further explained with reference to FIG. 6. In the condition of FIG. 6, there is no touch point detected at the time point $T_1$ (step 704). After obtaining the possible touch points, any pair of possible touch points can be selected as the pair of touch points, such as $P_{11}$ and $P_{22}$ (step 706). A first distance $d_{11}$ between the touch points $P_{11}$ and $P_{22}$ and a first slope $\tan(\theta_{11})$ of a line connecting the touch points $P_{11}$ and $P_{22}$ are calculated and recorded (step 710). When more than two touch signals are detected at the time point $T_3$ (step 712), the new positions of the selected pair of possible touch points $P_{11}''$ and $P_{22}''$ nearest to the touch points $P_{11}$ and $P_{22}$ are selected (step 714). A second distance $d_{22}$ between the new positions of the touch points $P_{11}''$ and $P_{22}''$ and a second slope $\tan(\theta_{22})$ of a line connecting the new positions of the touch points $P_{11}''$ and $P_{22}''$ are calculated and recorded (step 716). According to changes to distance and slope between the touch points $P_{11}$ and $P_{22}$ and the touch points $P_{11}''$ and $P_{22}''$, the gesture, such as rotating clockwise, rotating counter clockwise, zoom in and zoom out, can be recognized (step 718).

Figure 8A:
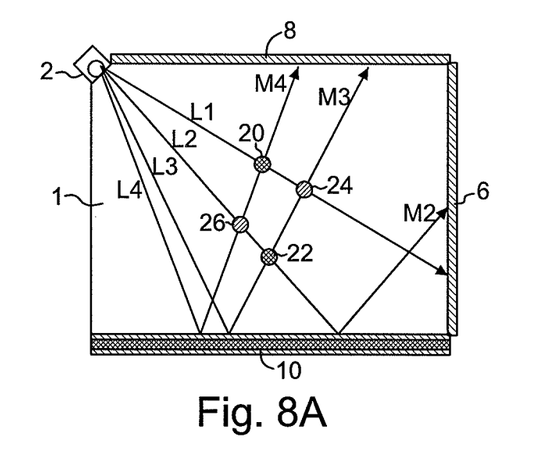
FIG. 8A illustrates another embodiment of the structure of a touch panel.
Figure 8B:
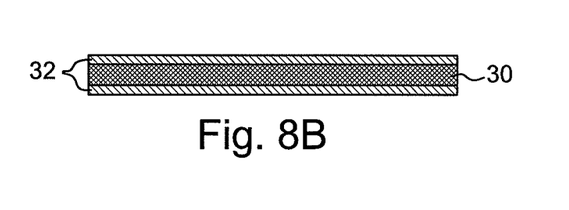
FIG. 8B illustrates the cross section view of an optical element.

FIG. 8A illustrates another embodiment of the structure of a touch panel 1 comprising an optical unit 2, an optical element 10, optical elements 6 and 8, and a processing unit (not shown), wherein the processing unit may be an individual device or integrated in the optical unit 2. The arrangements and functions of optical unit 2, the optical elements 6 and 8 and the processing unit are the same as those depicted in FIG. 1A described above. FIG. 8B shows the cross section view of optical element 10, which comprises two layers of retro-reflector 32 sandwiching a layer of mirror 30. Therefore, a part of the light incident to the optical element 10 is reflected by the mirror 30 and a part of the light incident to the optical element 10 is retro-reflected by the retro-reflector 32. Please note that the number of the retro-reflectors and the number of the mirrors are not limited to those of the current embodiment. The optical element 10 is arranged along a first edge of the touch panel. In FIG. 8A, when a light beam is emitted from the light emitting element of the optical unit 2 to the optical element 10, a part of the light beam is retro-reflected by the retro-reflectors 32 and backs to the optical unit 2, and a part of the light beam is reflected by the mirror 30 to the optical element 8 and then retro-reflected by the optical element 8 back to the mirror 30 and the optical unit 2.

Figure 8C:
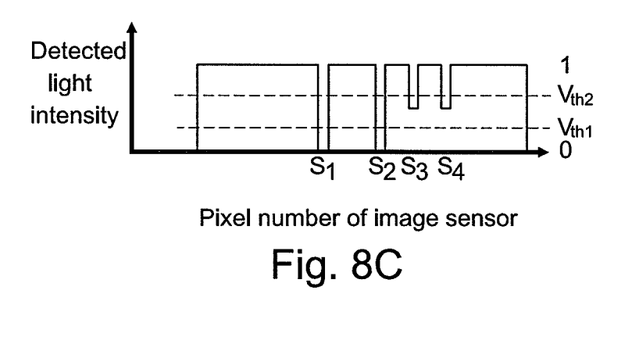
FIG. 8C shows the touch signals representing the intensity of light detected in the case depicted in FIG. 8A.

FIG. 8C shows the touch signals representing the intensity of light detected by the receiving element of the optical unit 2 under the case depicted in FIG. 8A. If the touch point is on the path of light $L_1$, $L_2$, $L_3$ and $L_4$, the intensity of the light detected is less than a first threshold $V_{th1}$. If the touch point is on the path of light $M_2$, $M_3$ and $M_4$ reflected by the optical element 10, the intensity of the detected light is greater than the first threshold $V_{th1}$ and less than a second threshold $V_{th2}$, since a part of light incident to the retro-reflectors 32 is retro-reflected to the optical unit 2. In FIG. 8C, the intensities of the signals $S_1$ and $S_2$ are less than a first threshold $V_{th1}$. That is to say, the touch points are located on the path of light $L_1$, $L_2$. Since the signal $S_3$ and $S_4$ are greater than the first threshold $V_{th1}$ and less than a second threshold $V_{th2}$, the touch points are located on the path of light $M_3$ and $M_4$ rather than $L_3$ and $L_4$. Based on the arrangement of the optical element comprising the retro-reflectors and the mirror, the number of paths of light for obtaining the possible touch points is reduced. Therefore, the number of possible touch points is also reduced. The method for recognizing the gesture with the present embodiment is the same as that depicted in FIG. 7. Comparing with the embodiment described in FIG. 1A, the present embodiment has the advantage of less possible touch points and less calculation effort.

Figure 9A:
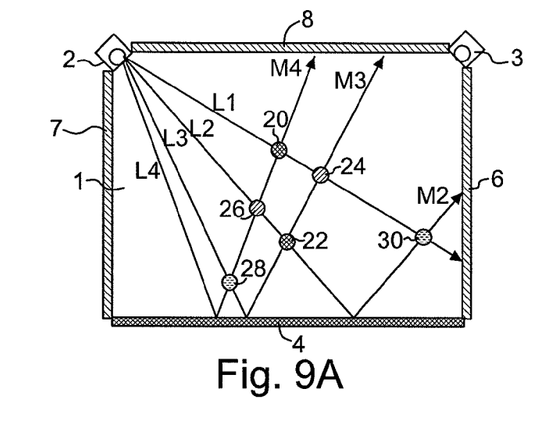
FIGS. 9A and 9B illustrate another embodiment with two optical units to detect one or more gesture.
Figure 9B:
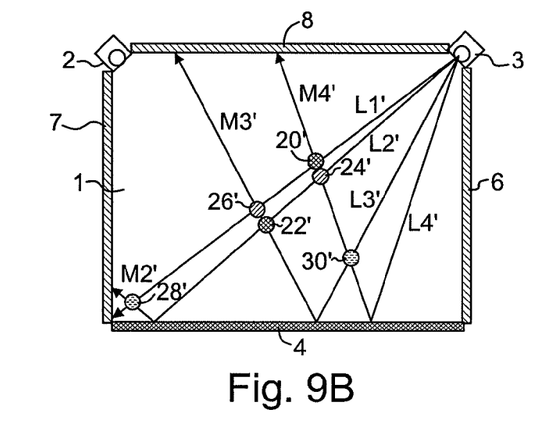
Figure 9C:
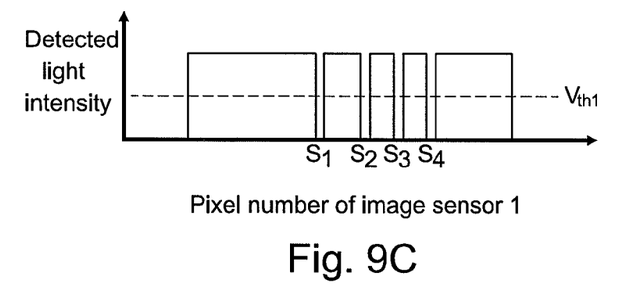
FIGS. 9C and 9D show the detected touch signals detected by the optical units respectively.
Figure 9D:
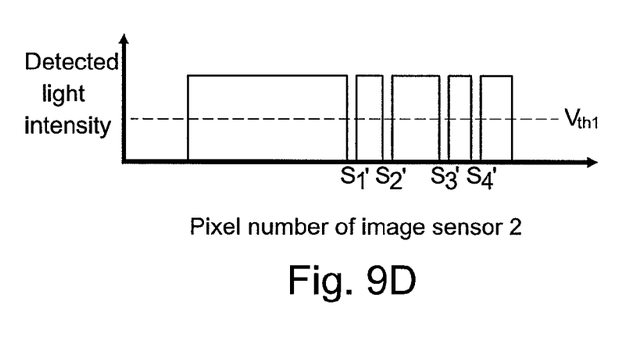

FIGS. 9A and 9B illustrates another embodiment of the structure of a touch panel 1 comprising an optical unit 2, another optical unit 3, optical elements 4, 6, 7 and 8 and a processing unit (not shown). The structure and function of the optical unit 3 are the same as those of the optical unit 2, but arranged at a second position of the touch panel 1, wherein the second position is adjacent to both the second and the third edges. The two optical units 2 and 3 can work sequentially to detect at least one gesture within the touch panel 1 based on the similar processing method disclosed previously. That is to say, the processor can determine more than one gesture presented on the touch panel 1 at the same time. FIGS. 9C and 9D show the detected touch signals detected by the optical units 2 and 3 respectively.

Figure 10:
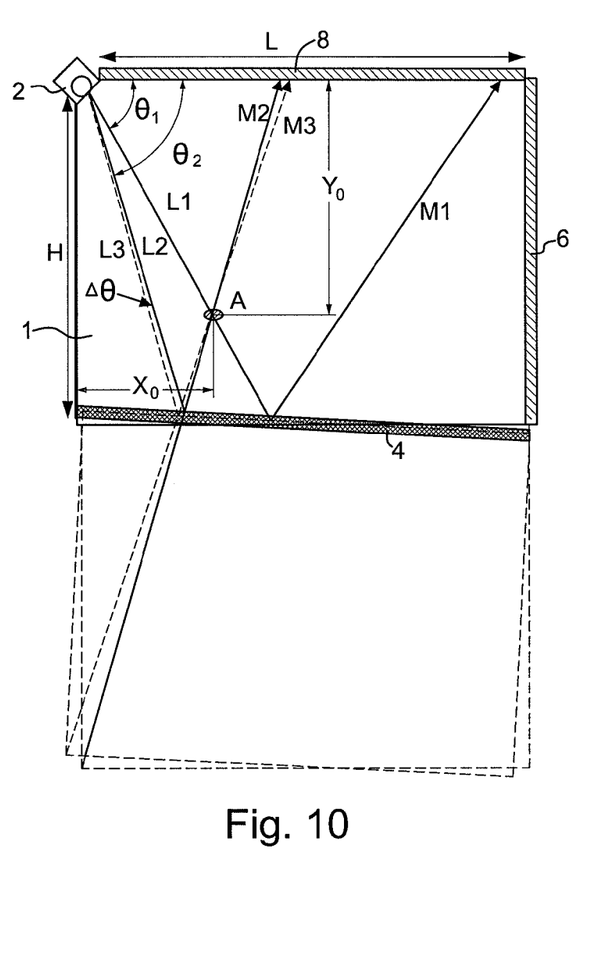
FIG. 10 illustrates a diagram of the touch panel with misaligned optical element.

FIG. 10 illustrates a diagram of the touch panel with misaligned optical element 4. If there is no misalignment of the optical element 4, the location of the touch point can be defined by the following expressions:

$$Y_0 = 2H \times \cot(\theta_2)/[\cot(\theta_1) + \cot(\theta_2)]$$

$$X_0 = Y_0 \times \cot(\theta_1)$$

If there is misalignment of the optical element 4 with a rotation angle $\Delta\theta$, the location of the touch point can be defined by the following expressions:

$$Y_0 = 2H \times \cot(\theta_2 + \Delta\theta)/[\cot(\theta_1) + \cot(\theta_2 + \Delta\theta)]$$

$$X_0 = Y_0 \times \cot(\theta_1)$$

Figure 11:
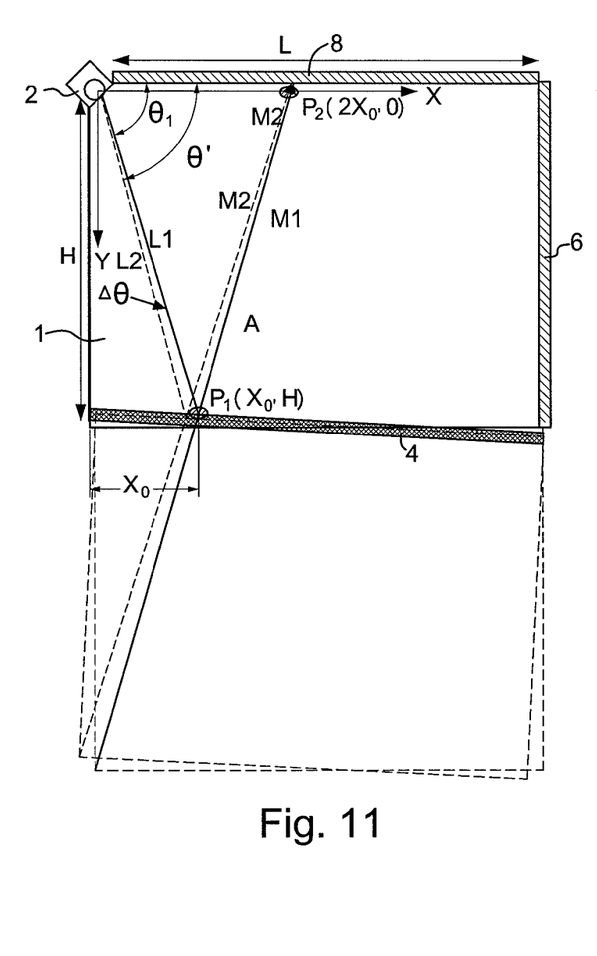
FIG. 11 shows calculation of misalignment of the optical element.
Figure 12:
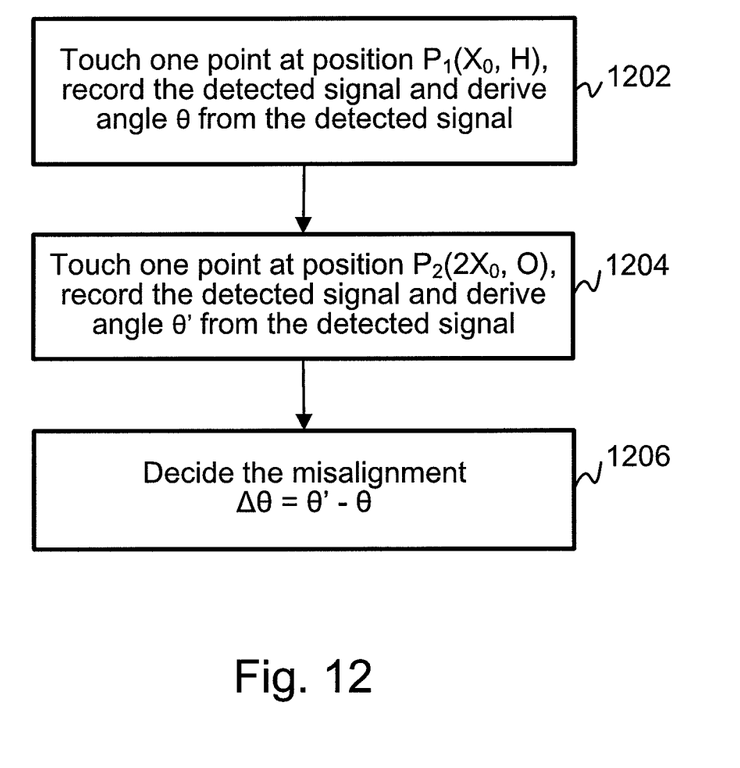
FIG. 12 illustrates the flow chart of the method of calculating misalignment of an optical element.

To calibrate the misalignment mentioned above, a calculation is made to find the rotation angle $\Delta\theta$. FIG. 11 shows calculating the misalignment of the optical element. FIG. 12 illustrates a flow chart of the method of calculating misalignment of an optical element. The method comprises touching a first point $P_1$ at the first edge at a predetermined distance $X_0$ from the fourth edge adjacent to the first and the third edges, and deriving a first angle $\theta$ between the third edge and a path of light emitted by the optical unit 2 and blocked by the first point $P_1$ (step 1202); touching a second point $P_2$ at the third edge at a distance $2X_0$ from the fourth edge, and deriving a second angle $\theta'$ between the third edge and the path of between the optical unit emitting the light and a point where the optical element reflects the light (step 1204); and then an angle of misalignment of the first optical element 4 is determined by a difference between the first and second angles $\Delta\theta = |\theta - \theta'|$ (step 1206). The method mentioned above for calculating misalignment is utilized for not only the optical element 4 but also the optical element 10.

Compared with conventional techniques which require three or more optical units, the touch panel in the present invention can recognize at least one gesture of multiple touch points with only one optical unit, and thus has the advantage of reducing manufacturing costs. In the method for recognizing at least one gesture on a touch panel, it is not necessary to determine the precise position of the touch points, resulting in only one detector being required. As a result, the calculation effort and manufacturing cost is reduced. Furthermore, the preferred touch panel embodiment is proposed to obtain the touch points with less possible touch points by utilizing the optical element comprising at least one layer of retro-reflector 32 and a layer of minor 30. To avoid errors caused by misalignment of the optical element, methods for calibration are proposed. In view of the above, the invention not only reduces cost but also improves the accuracy and reliability of the touch panel compared with the prior art.

In a preferred embodiment, the optical elements 6 and 8 are retro-reflectors, and the optical element 4 is a mirror. In another preferred embodiment, the optical elements 6 and 8 are retro-reflectors, and the optical element 10 comprises two retro-reflectors 32 and a mirror 30. However, the arrangement of the optical elements in the present invention is not limited by the above preferred embodiments. In addition, persons having general knowledge in the technical field can derive appropriate thresholds according to the arrangement of the optical elements. The details of the embodiments mentioned above can be derived from the disclosure of the specification of the subject application, and thus are omitted for the sake of brevity.

While some embodiments have been described above, it will be understood that the embodiments are examples only. Accordingly, the device and methods described herein should not be limited to the specific embodiments, and should be interpreted on the basis of the claims that follow in combination with the above description and the accompanying drawings.

What is claimed is:

1. A touch panel capable of recognizing at least one gesture, comprising
    a first optical unit, comprising a first light emitting element and a first light receiving element, arranged at a first position of the touch panel;
    a first optical element arranged along a first edge of the touch panel for reflecting light;
    a second and a third optical element arranged along a second and a third edge of the touch panel, respectively, for retro-reflecting the light, the second edge being adjacent to both the third edge and the first edge; and
    a processing unit for recognizing the at least one gesture according to changes to distance and slope of possible touch points.

2. The touch panel of claim 1, wherein the first optical element comprises a mirror.

3. The touch panel of claim 2, wherein the first optical element further comprises a retro-reflector, wherein a part of the light incident to the first optical element is reflected by the mirror and a part of the light incident to the first optical element is retro-reflected by the retro-reflector.

4. The touch panel of claim 1, further comprising
    a second optical unit, comprising a second light emitting element and a second light receiving element, arranged at a second position of the touch panel,
    wherein the processing unit recognizes the at least one gesture according to the changes to distance and slope of possible touch points detected sequentially by the first and second optical units.

5. The touch panel of claim 4, wherein the first position is adjacent to both the third edge and a fourth edge of the touch panel, and the second position is adjacent to both the second and the third edges.

6. The touch panel of claim 1, wherein the processing unit further performs calibration when a misalignment of the first optical element occurs.

7. A method for recognizing at least one gesture on a touch panel with a first optical unit, the method comprising
    obtaining a plurality of possible touch points according to intensities of light detected from a first optical element and retro-reflected by a second or a third optical element;
    selecting one pair of touch points from the possible touch points;
    locating new positions of the selected pair of touch points by finding the most adjacent points thereof; and
    recognizing the at least one gesture according to changes to distance and slope between the pair of touch points and the new positions of the selected pair of touch points,
    the step of obtaining a plurality of possible touch points comprising:
        generating a touch signal if intensity of light at a certain angle is less than a first threshold; and
        obtaining the possible touch points according to the intersection of paths of the light generating two touch signals.

8. The method of claim 7, further comprising
    calculating and recording a first distance between the pair of touch points and a first slope of a line connecting the pair of touch points; and calculating and recording a second distance between the new positions of the pair of touch points and a second slope of a line connecting the new positions of the pair of touch points.

9. The method of claim 7, wherein the step of selecting one pair of touch points comprising if a single touch point has been located, locating a touch point in possible touch points nearest to the single touch point and selecting a pair of possible touch points including the nearest touch point as the one pair of touch points; and if no single touch point has been located, selecting any pair of possible touch points in the possible touch points as the one pair of touch points.

10. The method of claim 7, wherein the step of obtaining a plurality of possible touch points comprising generating a touch signal representing that the light is directly blocked if intensity of light at a certain angle is less than a first threshold;

generating a touch signal representing that the light is reflected and retro-reflected by the first optical element if intensity of light at a certain angle is greater than the first threshold and less than a second threshold; and obtaining possible touch points according to the intersection of a path of light being directly blocked and a path of light being reflected and retro-reflected by the first optical element.

11. The method of claim 7, further comprising activating a second optical unit work sequentially with a first optical unit to recognize the at least one gesture.

12. A method of calculating misalignment of an optical element of a touch panel, the touch panel comprising a first, a second, a third and a fourth edge, the optical element being positioned at the first edge, the method comprising the steps of touching a first point at the first edge at a predetermined distance from the fourth edge adjacent to the first and the third edges and deriving a first angle between the third edge and a path connecting the first optical unit emitting light and the first point;

touching a second point at the third edge at a distance twice the predetermined distance from the fourth edge, and deriving a second angle between the third edge and the path between the optical unit emitting light and a point at the optical element reflecting the light; and determining an angle of misalignment of the optical element by a difference between the first and second angles.

* * * * *